US012617313B2

(12) United States Patent
Jargans et al.

(10) Patent No.: US 12,617,313 B2
(45) Date of Patent: May 5, 2026

(54) BALANCING OF AN ELECTRICAL ENERGY STORAGE USING A LOW VOLTAGE NETWORK

(71) Applicant: VOLVO TRUCK CORPORATION, Gothenburg (SE)

(72) Inventors: Ringolds Jargans, Trollhättan (SE); Pavan Balram, Gothenburg (SE); Brajesh Singh, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 119 days.

(21) Appl. No.: 18/537,456

(22) Filed: Dec. 12, 2023

(65) Prior Publication Data

US 2024/0198856 A1      Jun. 20, 2024

(30) Foreign Application Priority Data

Dec. 19, 2022    (EP) .................................... 22214687

(51) Int. Cl.
| | |
|---|---|
| *B60L 58/22* | (2019.01) |
| *B60L 58/13* | (2019.01) |
| *B60L 58/20* | (2019.01) |
| *B60L 58/16* | (2019.01) |

(52) U.S. Cl.
CPC .............. *B60L 58/22* (2019.02); *B60L 58/13* (2019.02); *B60L 58/20* (2019.02); *B60L 58/16* (2019.02); *B60L 2200/36* (2013.01); *B60L 2210/10* (2013.01)

(58) Field of Classification Search
CPC .......... B60L 58/20; B60L 53/20; B60L 50/64; B60L 58/12; B60L 58/16; B60L 2210/10; B60L 2240/547; H02J 7/342
See application file for complete search history.

(56) References Cited

U.S. PATENT DOCUMENTS

| | | | |
|---|---|---|---|
| 2013/0026991 A1 | 1/2013 | Roessler | |
| 2013/0038271 A1 | 2/2013 | Park | |
| 2015/0283915 A1 | 10/2015 | Kim et al. | |
| 2020/0195020 A1 | 6/2020 | Tanaka | |
| 2023/0155395 A1* | 5/2023 | Nolte ................ | H02M 3/33584 |
| | | | 320/118 |

FOREIGN PATENT DOCUMENTS

| | | | |
|---|---|---|---|
| CN | 110654251 A | 1/2020 | |
| EP | 0913292 A2 | 5/1999 | |
| EP | 0913292 A3 | 12/1999 | |
| EP | 3743307 B1 * | 11/2023 | ..... G01R 19/166542 |
| WO | 2012125158 A1 | 9/2012 | |

OTHER PUBLICATIONS

KR 20140050878 A with English translation; date filed Oct. 22, 2012; date published Apr. 30, 2014 (Year: 2014).*
Extended European Search Report in corresponding European Application No. 22214687.0 dated May 16, 2023 (20 pages).

* cited by examiner

*Primary Examiner* — Calvin Cheung
(74) *Attorney, Agent, or Firm* — Jeffri A. Kaminski; Venable LLP

(57) ABSTRACT

Balancing of rechargeable electrical energy storages is described. In particular aspects, the disclosure relates to balancing of an electrical energy storage using a low voltage network.

17 Claims, 12 Drawing Sheets

BALANCING OF AN ELECTRICAL ENERGY STORAGE USING A LOW VOLTAGE NETWORK

TECHNICAL FIELD

The disclosure relates generally to balancing of rechargeable electrical energy storages. In particular aspects, the disclosure relates to balancing of an electrical energy storage using a low voltage network. The disclosure can be applied in heavy-duty vehicles, such as trucks, buses, marine applications, and construction equipment. Although the disclosure may be described with respect to a particular vehicle, the disclosure is not restricted to any particular vehicle.

BACKGROUND

In heavy and medium duty vehicle applications multiple traction voltage battery packs are often installed in parallel to achieve high energy content.

It is desirable to keep the voltage levels of the battery packs equal within some tolerance to avoid high inrush currents during connection sequences. It may further be desirable to keep the state of charge levels between the battery packs equal within some tolerance to ensure optimal energy availability typically limited by the weakest cell or battery pack.

During usage and idle time of the vehicle the voltage and SOC levels can drift causing undesired behavior such as inrush or stray currents between packs and lowered energy availability.

This leads to the need of energy balancing between the multiple packs.

SUMMARY

According to a first aspect of the disclosure, there is provided a computer system comprising a processor device configured to: detect a charge parameter imbalance between rechargeable electrical energy storage packs of a vehicle; in response to detecting the imbalance, the processor device is configured to, until each electrical energy storage pack is at a target charge parameter level, repeat: (A) connect one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, (B) detect that either the low voltage electrical energy storage is at an upper-level capacity or that one of the one or more electrical energy storage pack is discharged to the target charge parameter level, (C) disconnect the one or more electrical energy storage pack from the bi-directional DC/DC converter, (D) connect at least one further electrical energy storage pack to the bi-directional DC/DC converter to transfer energy from the low voltage electrical energy storage to the at least one further electrical energy storage pack via the bi-directional DC/DC converter, (E) detect that either the low voltage electrical energy storage is at lower level capacity or that the one of the at least one further electrical energy storage pack is at the target charge parameter level, (F) disconnect the at least one further electrical energy storage pack from the bi-directional DC/DC converter.

The first aspect of the disclosure may seek to balance the electrical energy storage packs in a more energy efficient way. A technical benefit may include that the energy is persevered within the vehicle and thus not be dissipated through heating a resistor or similar. Furthermore, the present disclosure provides for an onboard balancing method that reduces downtime of the vehicle. Advantageously, the balancing method can be performed even without external electrical grid connection. Still further, the method provides for balancing the electrical energy storage system after service or replacement without the need for pre-balancing before installation.

Advantageously, the low voltage electrical energy storage of the vehicle may be a pre-existing low voltage electrical energy storage of the vehicle, thus there is no need for installing a further low voltage electrical energy storage in the vehicle.

According to a second aspect of the disclosure, there is provided a computer-implemented method, comprising: detecting, by a processor device of a computer system, a charge parameter imbalance between rechargeable electrical energy storage packs of a vehicle; in response to detecting the imbalance and until a target charge parameter level is reached for each of the electrical energy storage packs, perform: (A) connecting, by the processor device, one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, (B) detecting, by the processor device, that either the low voltage electrical energy storage is at an upper-level capacity or that one of the one or more electrical energy storage pack is discharged to the target charge parameter level, (C) disconnecting, by the processor device, the one or more electrical energy storage pack from the bi-directional DC/DC converter, if the target charge parameter level is not reached for each of the electrical energy storage packs (D) connecting, by the processor device, at least one further electrical energy storage pack to the bi-directional DC/DC converter to transfer energy from the low voltage electrical energy storage to the at least one further electrical energy storage pack via the bi-directional DC/DC converter, (E) detecting, by the processor device, that either the low voltage electrical energy storage is at lower-level capacity or that the one of the at least one further electrical energy storage pack is at the target charge parameter level, (F) disconnecting, by the processor device, the at least one further electrical energy storage pack from the bi-directional DC/DC converter; and repeating, by the processor device, steps A-F until each electrical energy storage pack is at the target charge parameter level.

The second aspect of the disclosure may seek to solve similar problems as the above discussed for the first aspect, and with the analogous technical benefits.

In one example the method may comprise: detecting, by the processor device, that the low voltage electrical energy storage device is initially at the maximum capacity, wherein the method is initiated by connecting, by the processor device, a further electrical energy storage pack to the bi-directional DC/DC converter to transfer energy from the low voltage electrical energy storage to the further electrical energy storage pack via the bi-directional DC/DC converter. Advantageously, flexibility to the balancing method is provided by being able to initiate the balancing sequence regardless of the present capacity of the low voltage electrical energy storage.

In one example the method may comprise: controlling, by the processor device, contactors connected to respective traction electrical energy storage packs and to a traction voltage bus connected to the bi-directional DC/DC converter, when connecting the electrical energy storage packs to the bi-directional DC/DC converter. Contactors generally provide a robust and reliable way to connect and disconnect the relatively high voltage electrical energy storage packs to/from the voltage bus.

In one example the method may comprise: detecting, by the processor device, that an electrical energy storage system comprising the electrical energy storage packs has been subject to service or repair, and in response, initiating the imbalance detection. Thus, the balancing sequence is automatically initiated, on-board the vehicle, without the need for external grid connection.

In one example the charge level parameter may be state of charge. Balancing state of charge reduces the risk of having a low SOC pack that limits the overall performance of the electrical energy storage system.

In one example, the charge level parameter may be voltage of the electrical energy storage packs. Balancing voltage reduces the risk of inrush or stray currents between electrical energy storage packs.

In one example, voltage and state of charge are both used as charge level parameters.

In one example, the upper-level capacity may be a maximum configured capacity of the low voltage electrical energy storage. The maximum configured capacity may be near the actual maximum capacity but should be interpreted as the maximum capacity that the low voltage electrical energy storage is configured or rated for.

In one example, the lower-level capacity may be a minimum configured capacity of the low voltage electrical energy storage. The minimum configured capacity may be near the actual minimum capacity but should be interpreted as the minimum capacity that the low voltage electrical energy storage is configured or rated for.

In one example, the number of electrical energy storage packs may be at least two, but more preferably at least three.

In one example, electrical energy storage packs may be connected to a common traction voltage bus via contactors controllable by the processor device.

In one example, the bi-directional DC/DC converter may be connected to the common traction voltage bus.

In one example, the low voltage electrical energy storage may be connected to the common traction voltage bus only via the bi-directional DC/DC converter.

In one example, the electrical energy storage packs may be comprised in an electrical energy storage system providing propulsion electrical power to a vehicle drivetrain.

The low voltage electrical energy storage has a substantially lower nominal voltage compared to the nominal voltage of the electrical energy storage packs. The low voltage electrical energy storage may be an auxiliary electrical energy storage.

In one example, the low voltage electrical energy storage is a 12-48 nominal voltage electrical energy storage, such as a 12 nominal voltage electrical energy storage, or a 24 nominal voltage electrical energy storage, or a 48 nominal voltage electrical energy storage.

In one example, the method may comprise: controlling, by the processor device, contactors connected to respective traction electrical energy storage packs and to a traction voltage bus connected to the bi-directional DC/DC converter, when connecting the electrical energy storage packs to the bi-directional DC/DC converter, wherein: the charge level parameter is at least one of state of charge and voltage of the electrical energy storage packs; the upper-level capacity is a maximum configured capacity of the low voltage electrical energy storage; the lower-level capacity is a minimum configured capacity of the low voltage electrical energy storage; the number of electrical energy storage packs is at least three; the electrical energy storage packs are connected to a common traction voltage bus via contactors controllable by the processor device; the bi-directional DC/DC converter is connected to the common traction voltage bus; the low voltage electrical energy storage is connected to the common traction voltage bus only via the bi-directional DC/DC converter; the electrical energy storage packs are comprised in an electrical energy storage system providing propulsion electrical power to a vehicle drivetrain; and the low voltage electrical energy storage is a 12-48 nominal voltage electrical energy storage, such as a 12 nominal voltage electrical energy storage, or a 24 nominal voltage electrical energy storage, or a 48 nominal voltage electrical energy storage.

According to a third aspect, there is provided a computer program product comprising program code for performing, when executed by the processor device, the method of the second aspect.

According to fourth aspect, there is provided a control system comprising one or more control units configured to perform the method of the second aspect.

According to fifth aspect, there is provided a non-transitory computer-readable storage medium comprising instructions, which when executed by the processor device, cause the processor device to perform the method of the second aspect.

According to a sixth aspect, there is provided vehicle comprising the processor device to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

5

Figure 6:
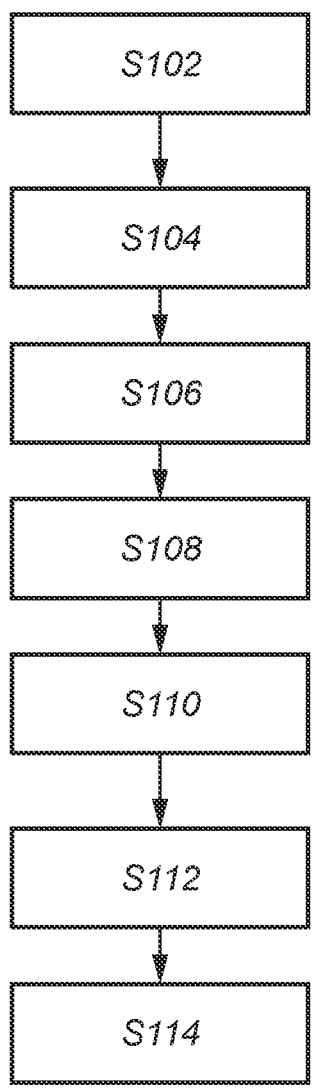
Figure 7:
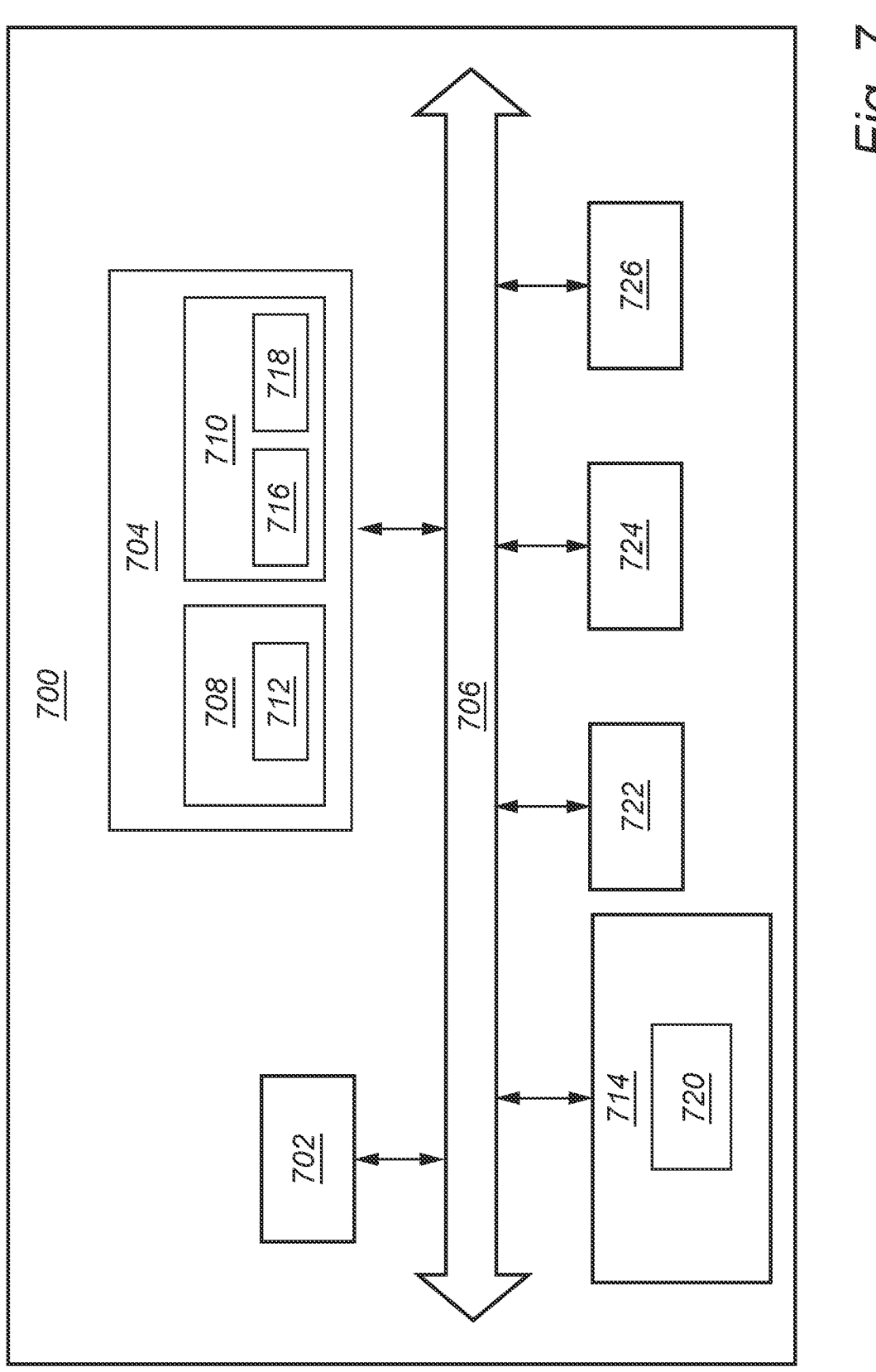

FIG. 6 is a flow chart of a method to balance electrical energy storage packs according to one example; and FIG. 7 is a schematic diagram of an exemplary computer system for implementing examples disclosed herein, according to one example.

DETAILED DESCRIPTION

Figure 1:
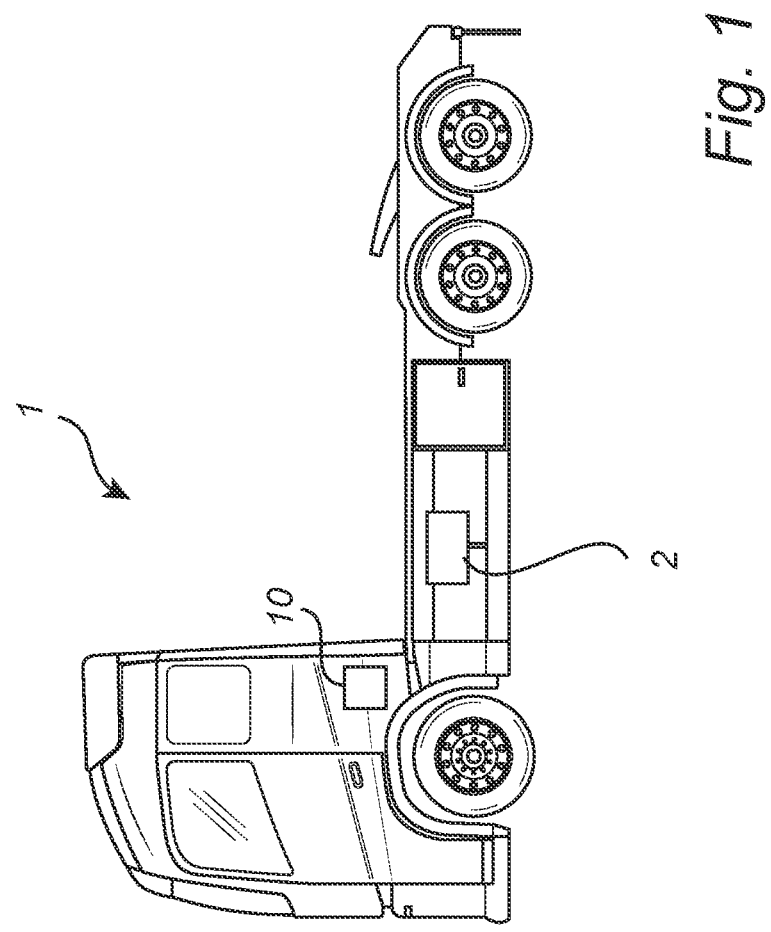
FIG. 1 is a vehicle in the form of an electrical truck according to one example of the present disclosure.

FIG. 1 illustrates a vehicle in the form of an electrical truck 1 comprising a rechargeable propulsion electrical energy storage system 2 generally comprising a plurality of series and parallel connected electrical energy storage cells. The propulsion electrical energy storage 2 is arranged to provide power to an electrical engine (not shown) arranged for providing propulsion for the electrical truck 1. The electrical truck 1 further comprises an electrical energy storage managing system 10 which is configured to monitor electrical energy storage cell characteristics such as state of charge (SOC), state of health (SOH), state of power (SOP), state of energy (SOE), state of capacity (SOQ), electrical energy storage voltage, state of resistance (SOR) i.e., internal impedance, and optionally temperature of the electrical energy storage cells. The propulsion electrical energy storage system 2 may be a Li-ion electrical energy storage comprising multiple packs with cells electrically connected in series and in parallel.

Although the vehicle in FIG. 1 is depicted as a heavy-duty truck, embodiments of the present disclosure may as well be implemented in other types of vehicles, such as in buses, light-weight trucks, passenger cars, construction equipment, industrial applications, and marine applications including e.g., vessels or ships.

Generally, it is desirable to ensure that electrical energy storage packs of the electrical energy storage system 2 are balanced in terms of voltage and state of charge. Traditionally this is performed during charging with the electrical energy storage system 2 connected to an external charger, or by dissipating the energy through a resistor. Examples of the present disclosure may allow for balancing the electrical energy storage packs without the need for an external charger or external grid connection, and with reduced losses.

Figure 2:
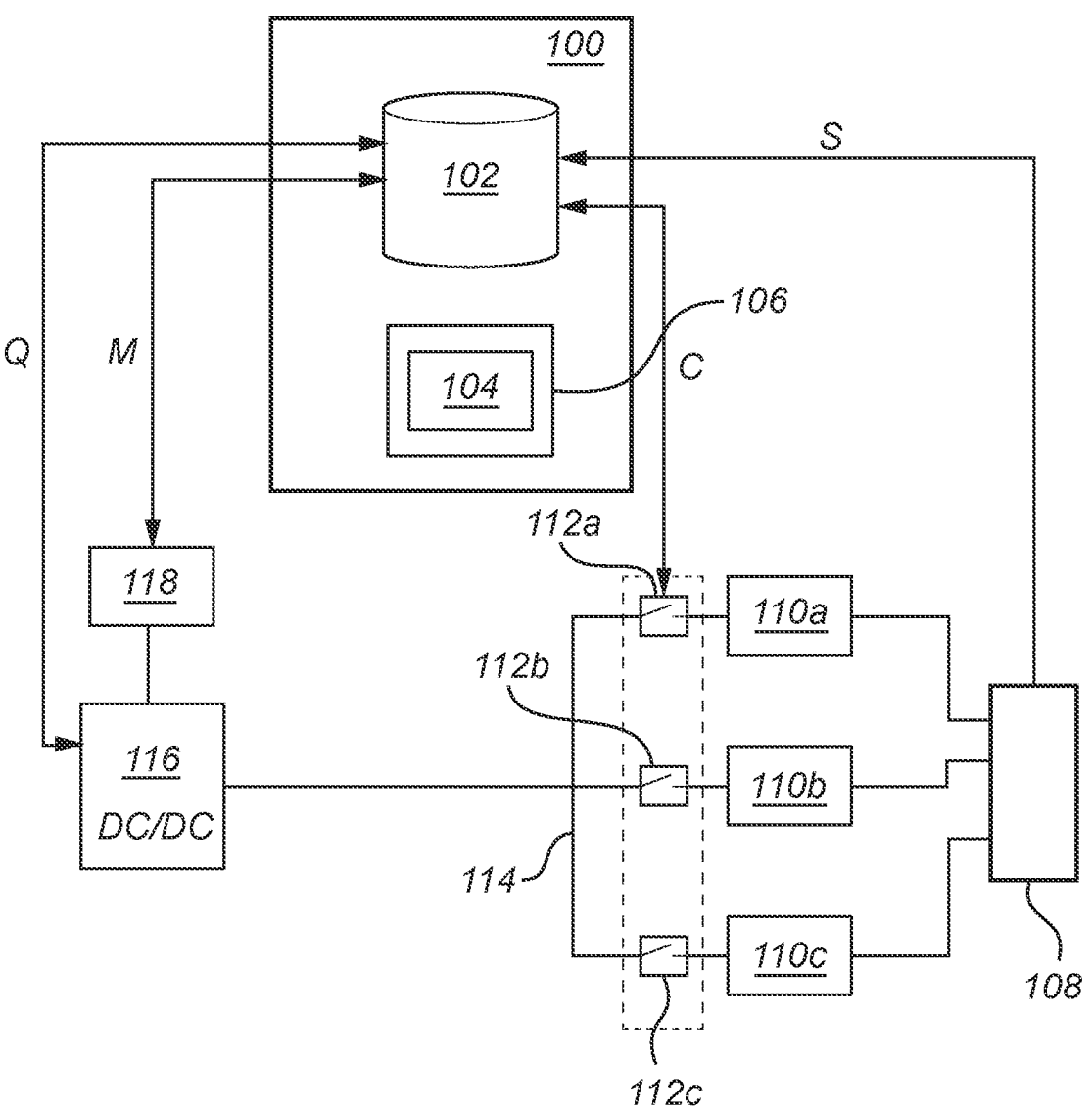
FIG. 2 is an exemplary system diagram of a computer system according to one example.

FIG. 2 is an exemplary system diagram of a computer system 100 according to one example. The computer system comprises a processor device 102 operating software components 104 for performing various functions, comparisons, and control operations discussed herein. The software components 104 may be stored in a memory 106 of the computer system 100 accessible to the processor device.

The processor device 102 is communicably connected to a sensor assembly 108 comprising e.g., processing circuitry, voltage sensors, electrical current sensors, and temperature sensors which allows monitoring of at least state of charge, SOC, and voltage, of each of the multiple electrical energy storage packs 110a, 110b, 110c of an electrical energy storage system of a vehicle. Here, three electrical energy storage packs 110a, 110b, 110c are shown. Generally, at least two are preferred for examples of the present disclosure. The sensor assembly is here conceptually illustrated. In a typical implementation, each electrical energy storage pack have its own management system with control circuitry and sensors.

The processor device 102 receives sensor data S from the sensor assembly 108 indicating at least a voltage of the electrical energy storage packs 110a, 110b, 110c, which can be used for determining SOC of the electrical energy storage packs 110a, 110b, 110c.

The processor device 102 controls, via control messages C, a set of switches 112a, 112b, 112c for independently connecting and disconnecting electrical energy storage packs 110a, 110b, 110c from a traction voltage bus 114 connected to a DC/DC converter 116. The message C may be sent to individual managing system for the specific electrical energy storage pack. In other words, the processor device may control switches, or more specially contactors 112a-c connected to respective traction electrical energy storage pack 110a, 110b, 110c and to the traction voltage bus 114 connected to the bi-directional DC/DC converter 116, when connecting the electrical energy storage packs 110a, 110b, 110c, to the bi-directional DC/DC converter 116.

The DC/DC 116 converter is electrically connected to the traction voltage bus 114 and to a low voltage electrical energy storage 118. Energy may be transferred to the low voltage electrical energy storage 118 from the electrical energy storage packs 110a, 110b, 110c via the traction voltage bus 114 and the DC/DC converter 116. The DC/DC converter 116 enables for converting the high voltages of the electrical energy storage packs 110a, 110b, 110c to a lower, suitable voltage level for the low voltage electrical energy storage 118.

Equally, energy may be transferred to the electrical energy storage packs 110a, 110b, 110c from the low voltage electrical energy storage 118 via the DC/DC converter 116 and the traction voltage bus 114. The DC/DC converter 116 enables for converting the low voltages of the low voltage electrical energy storage 118 to a higher, suitable voltage level for the voltages of the electrical energy storage packs 110a, 110b, 110c.

The low voltage electrical energy storage 118 is operates at lower nominal voltage than the electrical energy storage packs 110a, 110b, 110c, which are traction voltage electrical energy storage packs 110a, 110b, 110c arranged to provide energy for the operation of an electric motor 2 and other loads connected to the traction voltage bus. Most typically, the nominal voltage of low voltage electrical energy storage 118 is substantially lower than the nominal voltage electrical energy storage packs 110a, 110b, 110c, such as than lower than 50% of the nominal voltage electrical energy storage packs 110a, 110b, 110c, or lower than 30% of the nominal voltage electrical energy storage packs 110a, 110b, 110c, or lower than 200% of the nominal voltage electrical energy storage packs 110a, 110b, 110c.

In one example, the low voltage electrical energy storage 118 is a 12-48 nominal voltage electrical energy storage, such as for example a 12 nominal voltage electrical energy storage, or a 24 nominal voltage electrical energy storage, or a 48 nominal voltage electrical energy storage. Such low voltage electrical energy storages are typically a pre-existing in the vehicle and no additional low voltage electrical energy storages may need to be installed in the vehicle for examples of the present disclosure.

In example, the electrical energy storage packs 110a, 110b, 110c are connected to a common traction voltage bus 114 via contactors controllable by the processor device 102 either directly or indirectly via a battery management system.

The low voltage electrical energy storage 118 may have its only connection to the common traction voltage bus 114 via the bi-directional DC/DC converter 116 to allow for well controlled transfer of energy between the low voltage electrical energy storage 118 and the energy storage packs 110a, 110b, 110c.

The processor device 102 is connected to the low voltage electrical energy storage 118 to monitor its voltage levels directly or via digital communication. The voltage levels, or state of charge levels, which may be measured by a sensor of the low voltage electrical energy storage 118 is communicated to the processor device in messages M.

In addition, the DC/DC may include a dedicated processing circuitry for controlling the power conversion in DC/DC. The processing circuitry of the DC/DC converter 116 may be controlled by the processor device 102 via control messages Q.

Figure 3:
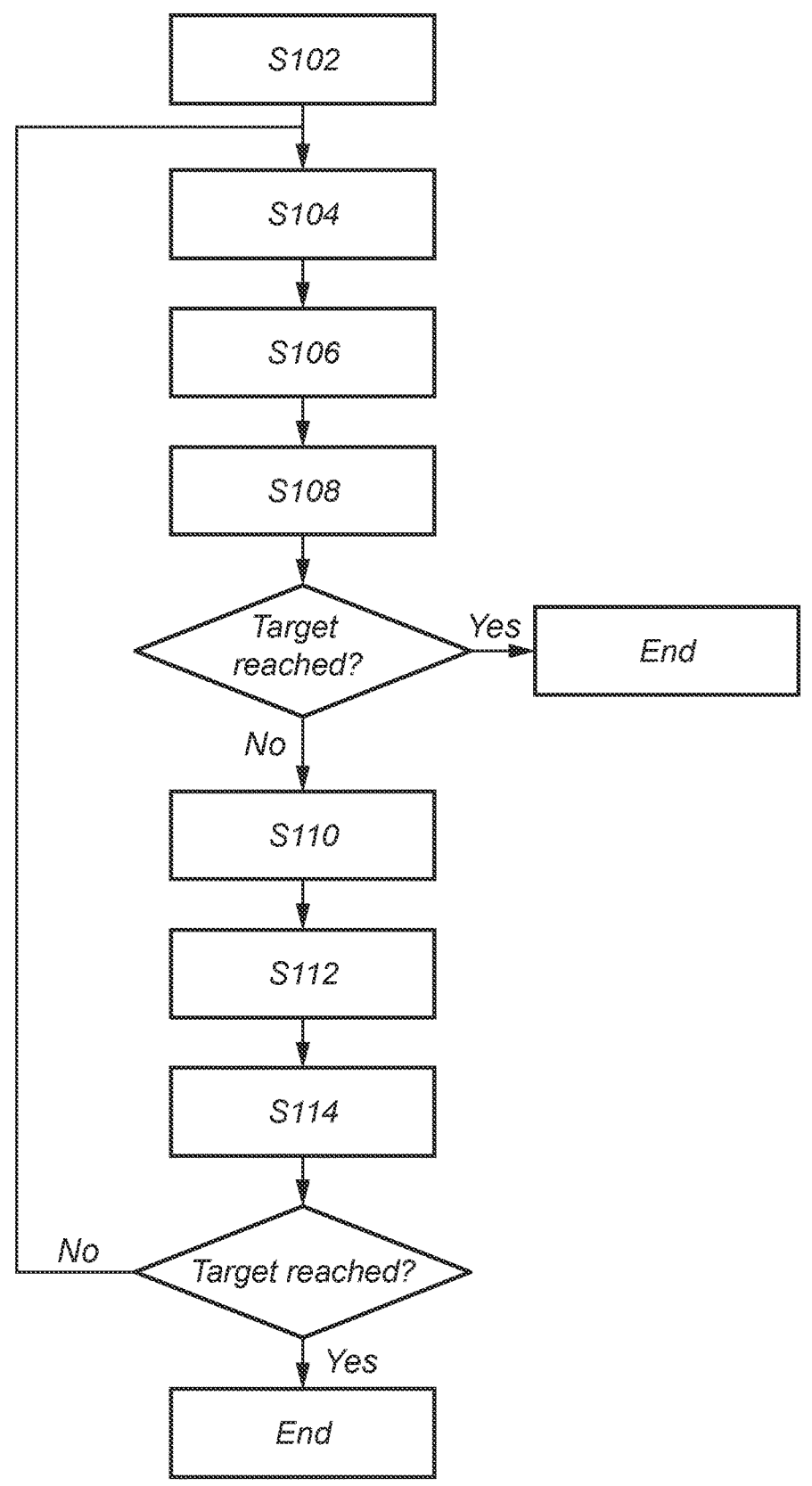
FIG. 3 is a flow chart of an exemplary method according to one example.

FIG. 3 is a flow chart of method steps according to examples of the present disclosure, and FIG. 4 is the exemplary system diagram in FIG. 2, but with example respective levels 111*a*, 111*b*, 111*c* of a charge parameter and present charge level 119 of the low voltage electrical energy storage 108 having upper level limit p1 and lower level limit p2 which may be voltage levels or state of charge levels. For example, the charge parameter level of electrical energy storage pack 110*a* is at the target level t. The charge parameter level of electrical energy storage 110*b* is at t-x, that is below the target level t. The charge parameter level of electrical energy storage pack 110*c* is at 1+x, that is larger than the target level t. For simplicity and clarity, the deviating level x is the same for both electrical energy storage packs 110*b-c*, but this of course not typically the case when the method is initiated.

In step S102 of the computer-implemented method, the processor device 102 detects a charge parameter imbalance between rechargeable electrical energy storage packs of a vehicle. The charge parameter is at least one of state of charge and voltage of the electrical energy storage packs. It is understood both state of charge and voltage may be considered one at the time, that, is consecutively. In other examples, state of charge and voltage are balanced simultaneously, or in an interleaved manner.

As discussed above, the charge parameter levels of electrical energy storage packs 110*a*, 110*b*, 110*c*, are not equal, with some predetermined margin, whereby an imbalance is concluded. Typically, a specific application will have their own margin for determining when balance is fulfilled, or equally when imbalance occurs. For example, an acceptable voltage imbalance may depend on internal resistance of the specific battery system and total voltage of the battery system to prevent high inrush current. State of charge imbalance may be determined based on specific systems total energy capacity as well as accuracy of state of charge estimation. However, it is generally known in the art how to specify imbalance of a specific battery system.

In response to detecting the imbalance, until each electrical energy storage pack 110*a-c* is at the target charge parameter level t: the processor device 102 connects, in step S104 one or more of the electrical energy storage packs to the bi-directional DC/DC converter 116 connectable to a low voltage electrical energy storage 118 to transfer energy from the one or more electrical energy storage packs to the low voltage electrical energy storage 118 via the bi-directional DC/DC converter 116. In this case, the processor device 102 has detected using the sensors 108 that the charge parameter level of electrical energy storage pack 110*c* exceeds the target level t. The processor device 102 controls the contactor 112*c* to connect the electrical energy storage pack 110*c* to common traction voltage bus 114 to transfer energy 120 to the low voltage electrical energy storage 118 via the bi-directional DC/DC converter 116. A DC/DC converter 116 is a power converter that converts a source of a direct current, DC, from one voltage level to another. Thus, the DC/DC converter 116 receives power from the electrical energy storage pack 110*c* and converts the power to a suitable voltage level for the low voltage electrical energy storage 118. The DC/DC converter is selected with the appropriate operating parameters such as voltage and power, as is known in the art.

In step S106, detecting, by the processor device 102, that either the low voltage electrical energy storage 118 is at an upper-level capacity or that one of the one or more electrical energy storage packs 110*a*, 110*b*, 110*c* is discharged to the target charge parameter level t. In this case, the electrical energy storage pack 110*c* has been discharged through the bi-directional DC/DC converter 116 and the low voltage electrical energy storage 118 to the target charge parameter level t.

Figure 4A:
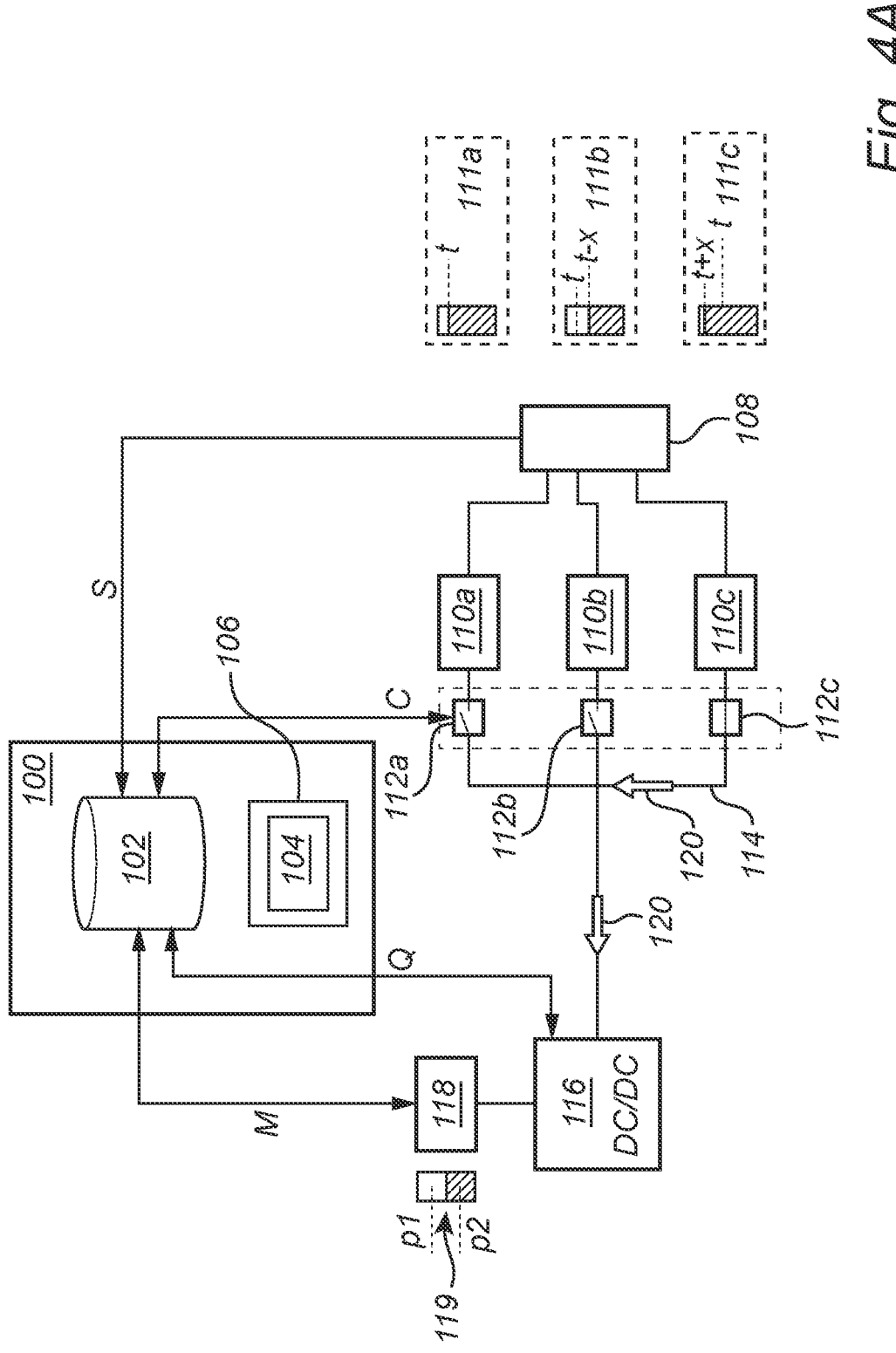
FIG. 4A is an exemplary system diagram in one charge parameter level state.
Figure 4B:
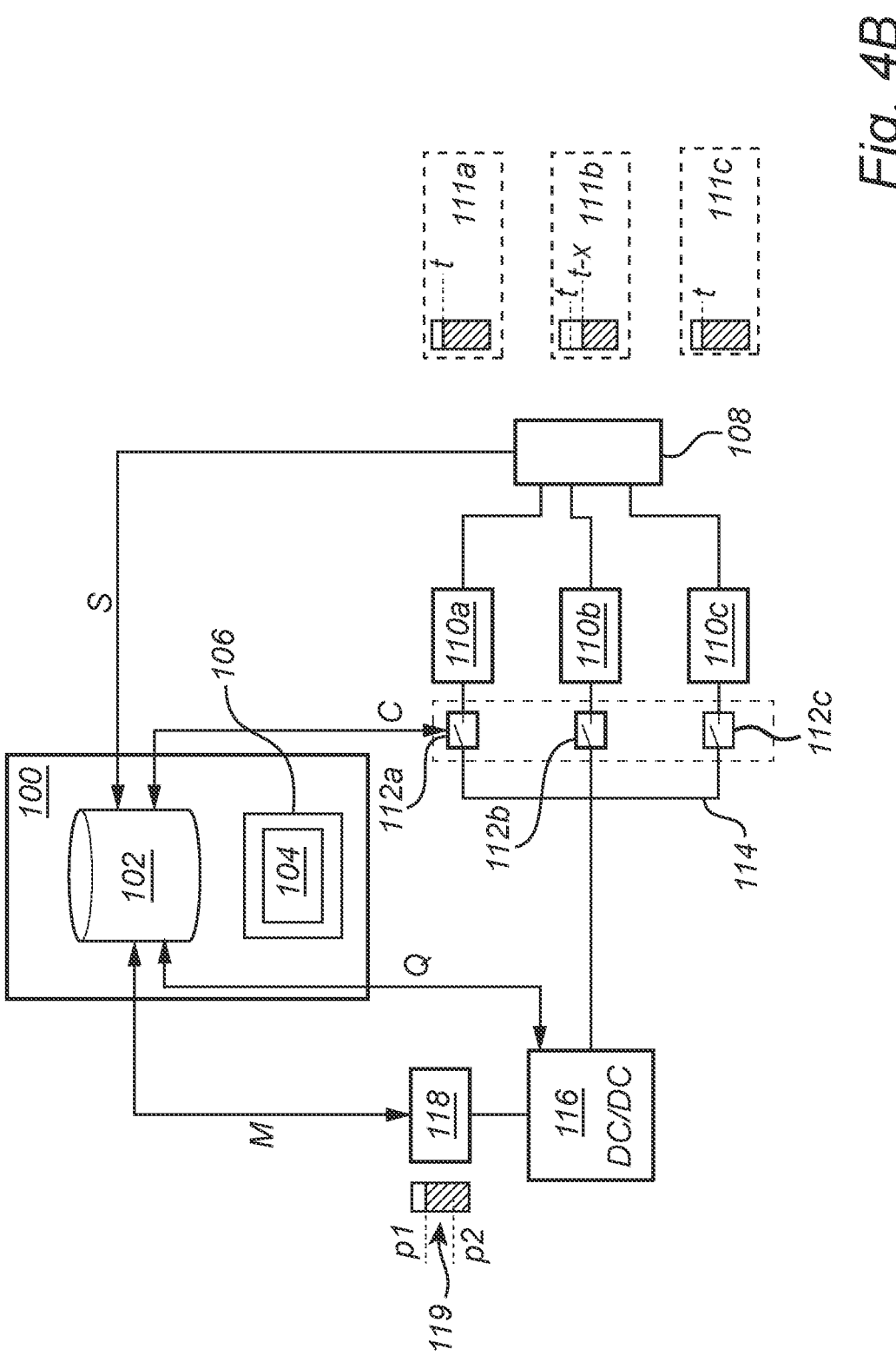
FIG. 4B is an exemplary system diagram in another charge parameter level state.

In step S108, the processor device 102 disconnects, see FIG. 4B, the electrical energy storage pack 110*c* from the bi-directional DC/DC converter by controlling the contactor 112*c* to open the connecting to the common voltage traction bus 114.

Figure 4C:
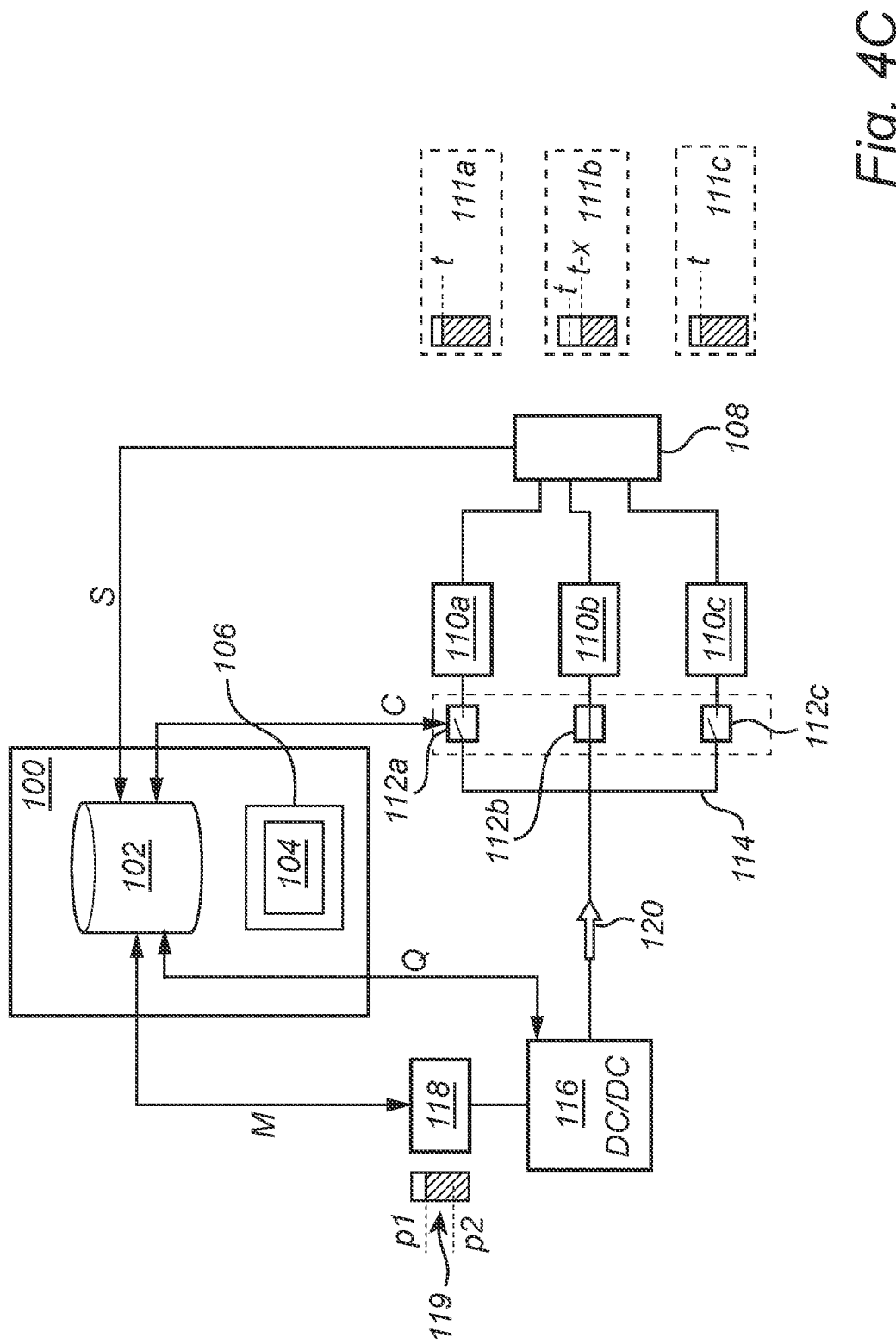
FIG. 4C is an exemplary system diagram in one charge parameter level state.

If the target charge parameter level is not reached for each of the electrical energy storage packs, then in step S110, connecting, see FIG. 4C, by the processor device 102, at least one further electrical energy storage pack 110*b* to the bi-directional DC/DC converter to transfer energy 120 from the low voltage electrical energy storage 118 to the at least one further electrical energy storage pack 110*b* via the bi-directional DC/DC converter 116. In this case, the electrical energy storage pack 110*b* has charge parameter level t-x, that is, below the target level t. The processor device 102 controls the contactor 112*b* to connect the electrical energy storage pack 110*b* to the common traction voltage bus 114 so that the low voltage electrical energy storage 118 can transfer energy to the electrical energy storage pack 110*b* via the bi-directional DC/DC converter 116 that converts the voltage level of the received power to a suitable level for the electrical energy storage pack 110*b*.

Figure 4D:
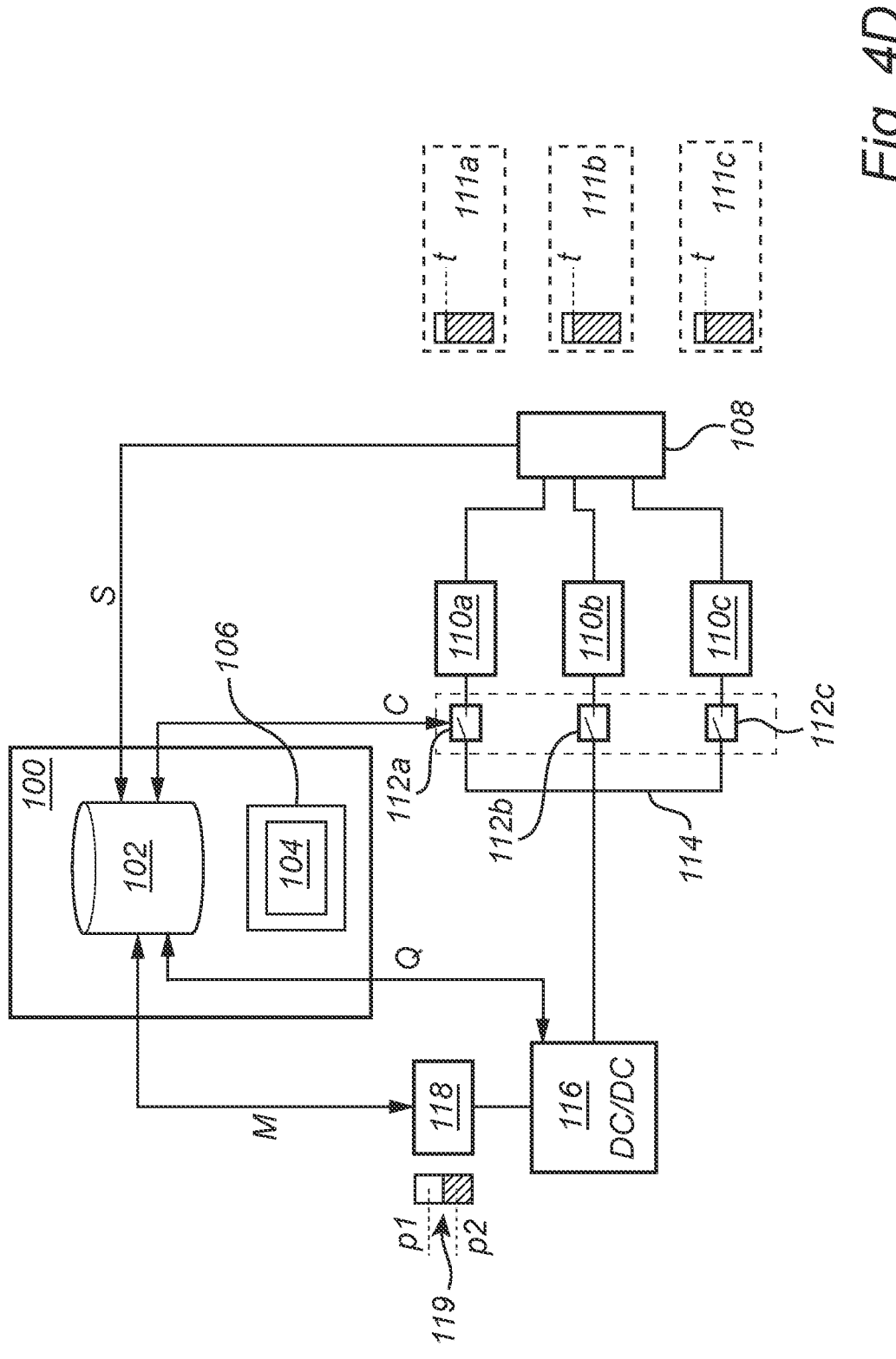
FIG. 4D is an exemplary system diagram in one charge parameter level state.

In step S112, detecting, by the processor device, that either the low voltage electrical energy storage 118 is at lower-level capacity or that the one 110*b* of the at least one further electrical energy storage pack is at the target charge parameter level t. Here, the electrical energy storage pack 110*b* has been charged by the low voltage electrical energy storage pack 118 to the target charge parameter level t as shown in FIG. 4D.

In step S114, disconnecting, by the processor device 102, the at least one further electrical energy storage pack 110*b* from the bi-directional DC/DC converter by opening the contactor 112*b*.

In the above scheme, the low voltage electrical energy storage device 118 may be a relatively low charging level so that it can receive charge from the electrical energy storage packs 110*c*. However, in case the processor device 102 detects that the low voltage electrical energy storage device is initially at or above the maximum configured capacity, the method is initiated by connecting S110, by the processor device, a further electrical energy storage pack 110*b* to the bi-directional DC/DC converter 116 to transfer energy 120 from the low voltage electrical energy storage 118 to the further electrical energy storage pack 110*b* via the bi-directional DC/DC converter 116.

Figure 4E:
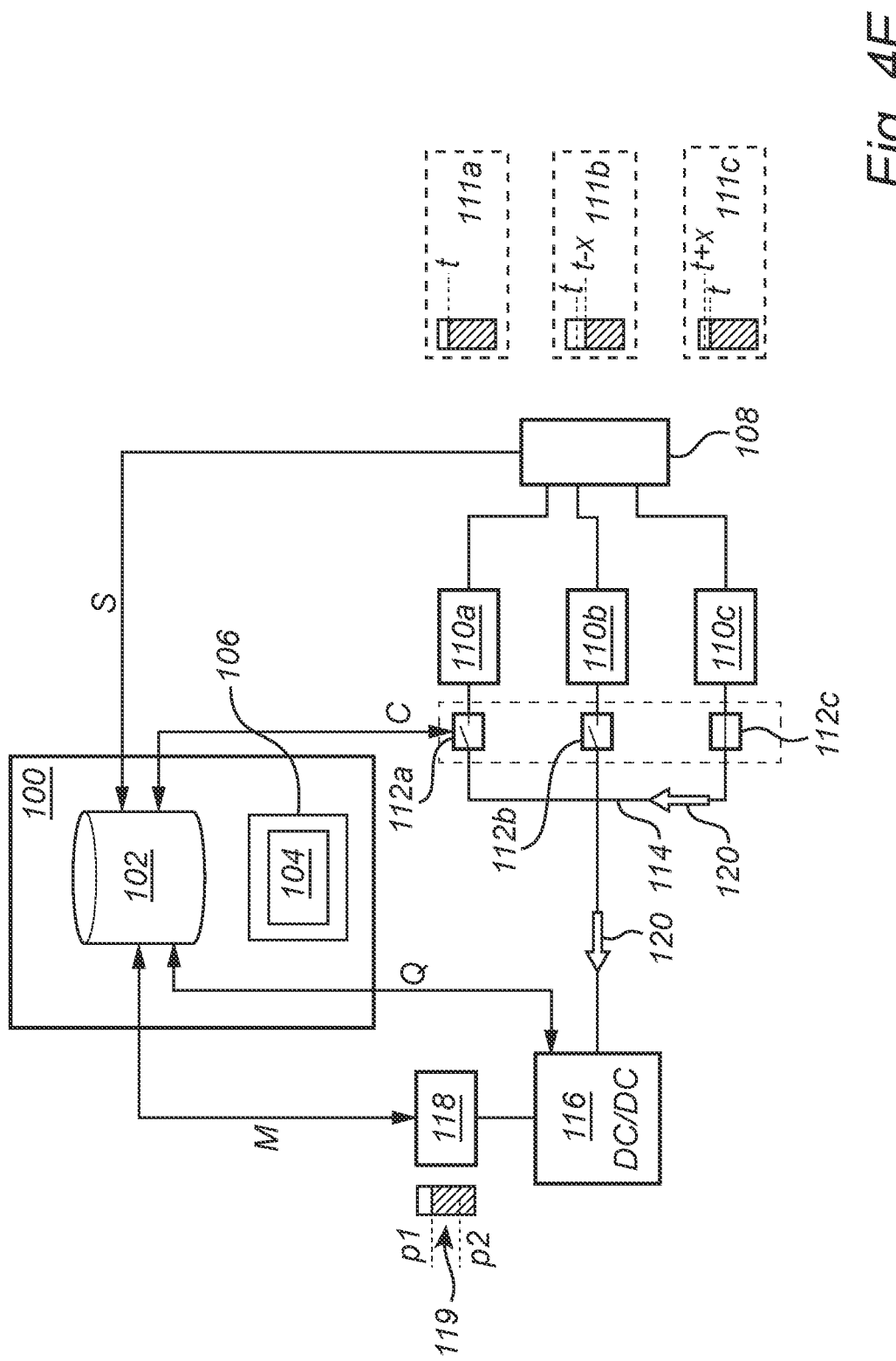
FIG. 4E is an exemplary system diagram in one charge parameter level state.

Turning now to FIG. 4E, while charging the low voltage electrical energy storage it may occur that the processor device 102 detects that the low voltage electrical energy storage 118 has reached its upper-level capacity, p, before the electrical energy storage pack 110*c* is discharged to the target charge parameter level t. In such case, the processor device 102 disconnects, in step S108 the electrical energy storage pack 110*c* from the bi-directional DC/DC converter 116.

Figure 4F:
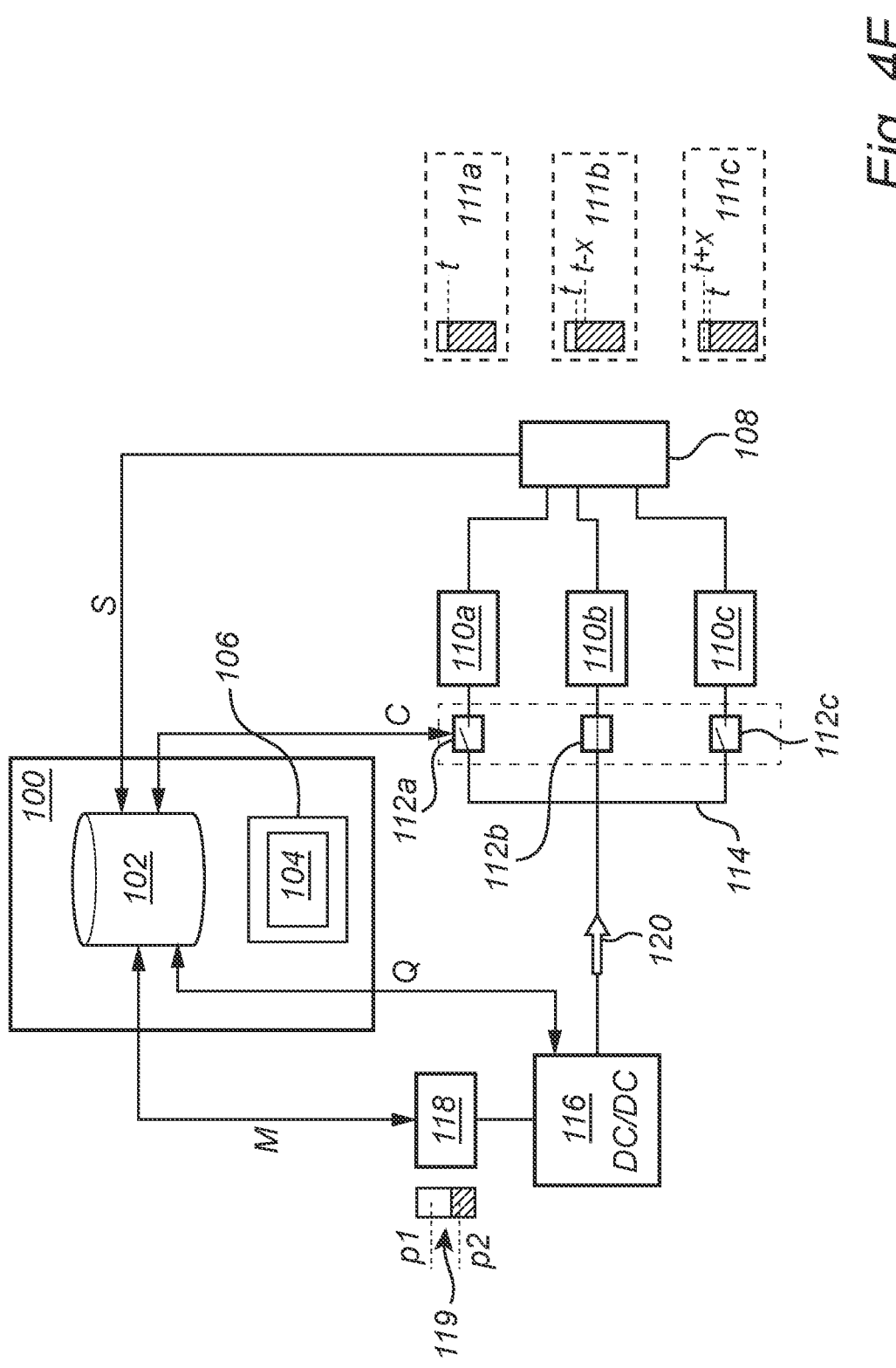
FIG. 4F is an exemplary system diagram in one charge parameter level state.

Next, the processor device 102 connects in step S110, FIG. 4F, the electrical energy storage pack 110b to the bi-directional DC/DC converter to transfer energy 120 from the low voltage electrical energy storage 118 to the at least one further electrical energy storage pack 110b via the bi-directional DC/DC converter 116. This discharges the low voltage electrical energy storage 118 while charges the electrical energy storage pack 110b so that it may reached the target charge parameter level t.

In the next iteration, energy is transferred from the electrical energy storage pack 110c to the low voltage electrical energy storage 118 as discussed in conjunction with step S104.

The method is iterated until the processor device 102 detects that each of the electrical energy storage packs 110a, 110b, 110c of the electrical energy storage system 2 has reached the target charge parameter level t, such as a target voltage and/or a target state of charge.

The target charge parameter level t may be determined based on the present charge parameter levels of the electrical energy storage packs. For example, the average present charge parameter level of the electrical energy storage packs, or the median present charge parameter level of the electrical energy storage packs may be selected. Using a medium or average of the present charge parameter level as the target charge parameter level may provide for a faster balancing sequence.

Furthermore, in case more than one of the electrical energy storage packs are connected jointly as a group to the bi-directional DC/DC converter to transfer energy to the low voltage electrical energy storage or to receive energy from the low voltage electrical energy storage, the electrical energy storage packs that have similar present charge parameter levels within some predetermined margin may be selected. If one of the electrical energy storage packs reaches the target charge parameter level t, or the low voltage electrical energy storage reaches one of its capacity levels, the entire group of electrical energy storage packs is disconnected from the bi-directional DC/DC converter, and a further group can subsequently be connected to the bi-directional DC/DC converter.

The balancing method may be initiated at some given intervals, or whenever an imbalance is detected. Further, in some examples, the method is initiated when the processor device 102 detects that an electrical energy storage system comprising the electrical energy storage packs has been subject to service or repair.

The upper-level capacity may be a maximum configured capacity of the low voltage electrical energy storage. This is not necessarily at maximum capacity but may be a nominal max voltage of the low voltage electrical energy storage according to a rating of the low voltage electrical energy storage.

The lower-level capacity may be a minimum configured capacity of the low voltage electrical energy storage. This is not necessarily at full discharge but may be a nominal minimum voltage of the low voltage electrical energy storage according to a rating of the low voltage electrical energy storage.

A vehicle may comprise more than one low voltage electrical energy storages having their own bi-directional DC/DC converter connected to the set of traction voltage electrical energy storage packs. Thus more than one low voltage networks may be utilized to speed up the balancing procedure.

The low voltage electrical energy storage may be a rechargeable battery, such as a Li-ion, lead-acid, or NiMH battery to mention a few examples.

In the computer system 100, the processor device 102 is configured to: detect a charge parameter imbalance between rechargeable electrical energy storage packs 110a, 110b, 110c of a vehicle; in response to detecting the imbalance, the processor device 102 is configured to, until each electrical energy storage pack 110a, 110b, 110c is at a target charge parameter level, repeat: (A) connect one or more of the electrical energy storage packs 110a, 110b, 110c to a bi-directional DC/DC converter 116 connectable to a low voltage electrical energy storage 118 to transfer energy from the one or more electrical energy storage pack 110a, 110b, 110c to the low voltage electrical energy storage 118 via the bi-directional DC/DC converter 116, (B) detect that either the low voltage electrical energy storage 118 is at an upper-level capacity or that one of the one or more electrical energy storage pack 110a, 110b, 110c is discharged to the target charge parameter level; (C) disconnect the one or more electrical energy storage pack 110a, 110b, 110c from the bi-directional DC/DC converter, (D) connect at least one further electrical energy storage pack 110a, 110b, 110c to the bi-directional DC/DC converter 116 to transfer energy from the low voltage electrical energy storage to the at least one further electrical energy storage pack 110a, 110b, 110c via the bi-directional DC/DC converter, (E) detect that either the low voltage electrical energy storage 118 is at lower level capacity or that the one of the at least one further electrical energy storage pack 110a, 110b, 110c is at the target charge parameter level, (F) disconnect the at least one further electrical energy storage pack 110a, 110b, 110c from the bi-directional DC/DC converter 116.

In one example, there the method may comprise: controlling, by the processor device, contactors connected to respective traction electrical energy storage packs and to a traction voltage bus connected to the bi-directional DC/DC converter, when connecting the electrical energy storage packs to the bi-directional DC/DC converter, wherein: the charge level parameter is at least one of state of charge and voltage of the electrical energy storage packs; the upper-level capacity is a maximum configured capacity of the low voltage electrical energy storage; the lower-level capacity is a minimum configured capacity of the low voltage electrical energy storage; the number of electrical energy storage packs is at least two; the electrical energy storage packs are connected to a common traction voltage bus via contactors controllable by the processor device; the bi-directional DC/DC converter is connected to the common traction voltage bus; the low voltage electrical energy storage is connected to the common traction voltage bus only via the bi-directional DC/DC converter; the electrical energy storage packs are comprised in an electrical energy storage system providing propulsion electrical power to a vehicle drivetrain; and the low voltage electrical energy storage is a 12-48 nominal voltage electrical energy storage, such as a 12 nominal voltage electrical energy storage, or a 24 nominal voltage electrical energy storage, or a 48 nominal voltage electrical energy storage.

There is further provided the vehicle 1 including the processor device 102.

Further, a computer program product 104 is provided comprising program code for performing, when executed by the processor device, perform the method of any of the herein disclosed examples.

There is further provided a control system 100 comprising one or more control units configured to perform the method of any of the herein disclosed examples.

A non-transitory computer-readable storage medium 106 comprising instructions, which when executed by the processor device, cause the processor device to perform the method of any of the herein disclosed examples.

Figure 5:
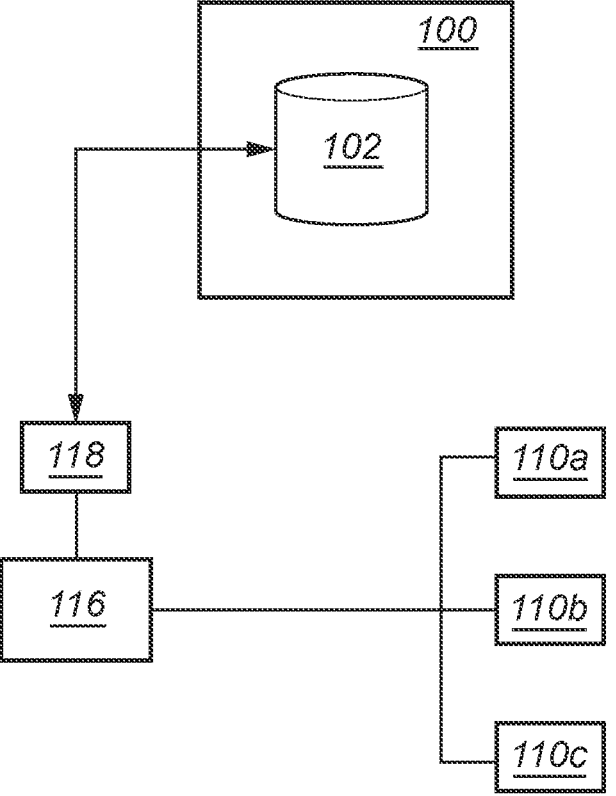
FIG. 5 is another view of FIG. 2, according to another example.

FIG. 5 is another view of FIG. 2, according to another example. FIG. 5 illustrates a computer system 100 comprising a processor device 102 configured to: detect a charge parameter imbalance between rechargeable electrical energy storage packs 110a, 110b, 110c of a vehicle. In response to detecting the imbalance, the processor device 102 is configured to, until each electrical energy storage pack 110a, 110b, 110c is at a target charge parameter level: connect one or more of the electrical energy storage packs 110a, 110b, 110c to a bi-directional DC/DC converter 116 connectable to a low voltage electrical energy storage 118 to transfer energy from the one or more electrical energy storage pack 110a, 110b, 110c to the low voltage electrical energy storage 118 via the bi-directional DC/DC converter 116, detect that either the low voltage electrical energy storage 118 is at an upper-level capacity or that one of the one or more electrical energy storage pack 110a, 110b, 110c is discharged to the target charge parameter level, disconnect the one or more electrical energy storage pack 110a, 110b, 110c from the bi-directional DC/DC converter 116, connect at least one further electrical energy storage pack 110a, 110b, 110c to the bi-directional DC/DC converter 116 to transfer energy from the low voltage electrical energy storage 118 to the at least one further electrical energy storage pack 110a, 110b, 110c via the bi-directional DC/DC converter 116, detect that either the low voltage electrical energy storage 118 is at lower level capacity or that the one of the at least one further electrical energy storage pack 110a, 110b, 110c is at the target charge parameter level, disconnect the at least one further electrical energy storage pack 110a, 110b, 110c from the bi-directional DC/DC converter 116.

FIG. 6 is a flow chart of a method to balance electrical energy storage packs according to one example. In the computer implemented method, detecting S102, by a processor device of a computer system, a charge parameter imbalance between rechargeable electrical energy storage packs of a vehicle; in response to detecting the imbalance and until a target charge parameter level is reached for each of the electrical energy storage packs: connecting S104, by the processor device, one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, detecting S106, by the processor device, that either the low voltage electrical energy storage is at an upper-level capacity or that one of the one or more electrical energy storage pack is discharged to the target charge parameter level, disconnecting S108, by the processor device, the one or more electrical energy storage pack from the bi-directional DC/DC converter, if the target charge parameter level is not reached for each of the electrical energy storage packs, connecting S110, by the processor device, at least one further electrical energy storage pack to the bi-directional DC/DC converter to transfer energy from the low voltage electrical energy storage to the at least one further electrical energy storage pack via the bi-directional DC/DC converter, detecting S112, by the processor device, that either the low voltage electrical energy storage is at lower-level capacity or that the one of the at least one further electrical energy storage pack is at the target charge parameter level, disconnecting S114, by the processor device, the at least one further electrical energy storage pack from the bi-directional DC/DC converter.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include a processor device 702 (may also be referred to as a control unit), a memory 704, and a system bus 706. The computer system 700 may include at least one computing device having the processor device 702. The system bus 706 provides an interface for system components including, but not limited to, the memory 704 and the processor device 702. The processor device 702 may include any number of hardware components for conducting data or signal processing or for executing computer code stored in memory 704. The processor device 702 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program product 720 stored on a transitory or non-transitory computer-usable or computer-readable storage medium (e.g., single medium or multiple media), such as the storage device 714, which includes complex programming instructions (e.g., complex computer-readable program code) to cause the processor device 702 to carry out the steps described herein. Thus, the computer-readable program code can comprise software instructions for implementing the functionality of the examples described herein when executed by the processor device 702. The processor device 702 may serve as a controller or control system for the computer system 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system

700 may also include a communications interface 726 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

detect a charge parameter imbalance between rechargeable electrical energy storage packs of a vehicle, the electrical energy storage packs being independently connectable to a bi-directional DC/DC converter via a traction voltage bus;

in response to detecting the imbalance, the processor device is configured to, until each electrical energy storage pack is at a target charge parameter level:

(A) connect one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, (B) detect that either the low voltage electrical energy storage is at an upper-level capacity or that one of the one or more electrical energy storage pack is discharged to the target charge parameter level, (C) disconnect the one or more electrical energy storage pack from the bi-directional DC/DC converter, (D) connect at least one further electrical energy storage pack to the bi-directional DC/DC converter to transfer energy from the low voltage electrical energy storage to the at least one further electrical energy storage pack via the bi-directional DC/DC converter, (E) detect that either the low voltage electrical energy storage is at lower level capacity or that the one of the at least one further electrical energy storage pack is at the target charge parameter level, and (F) disconnect the at least one further electrical energy storage pack from the bi-directional DC/DC converter.

2. A computer-implemented method, comprising:

detecting, by a processor device of a computer system, a charge parameter imbalance between rechargeable electrical energy storage packs of a vehicle, the electrical energy storage packs being independently connectable to a bi-directional DC/DC converter via a traction voltage bus;

in response to detecting the imbalance and until a target charge parameter level is reached for each of the electrical energy storage packs:

(A) connecting, by the processor device, one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, (B) detecting, by the processor device, that either the low voltage electrical energy storage is at an upper-level capacity or that one of the one or more electrical energy storage pack is discharged to the target charge parameter level, (C) disconnecting, by the processor device, the one or more electrical energy storage pack from the bi-directional DC/DC converter, if the target charge parameter level is not reached for each of the electrical energy storage packs, (D) connecting, by the processor device, at least one further electrical energy storage pack to the bi-directional DC/DC converter to transfer energy from the low voltage electrical energy storage to the at least one further electrical energy storage pack via the bi-directional DC/DC converter, (E) detecting, by the processor device, that either the low voltage electrical energy storage is at lower-level capacity or that the one of the at least one further electrical energy storage pack is at the target charge parameter level, and (F) disconnecting, by the processor device, the at least one further electrical energy storage pack from the bi-directional DC/DC converter.

3. The method of claim 2, further comprising:

detecting, by the processor device, that the low voltage electrical energy storage device is initially at the maximum capacity, wherein the method is initiated by connecting, by the processor device, a further electrical energy storage pack to the bi-directional DC/DC converter to transfer energy from the low voltage electrical energy storage to the further electrical energy storage pack via the bi-directional DC/DC converter.

4. The method of claim 2, further comprising:

controlling, by the processor device, contactors connected to respective traction electrical energy storage packs and to a traction voltage bus connected to the bi-directional DC/DC converter, when connecting the electrical energy storage packs to the bi-directional DC/DC converter.

5. The method of claim 2, further comprising:

detecting, by the processor device, that an electrical energy storage system comprising the electrical energy storage packs has been subject to service or repair, and in response, initiating the imbalance detection.

6. The method of claim 2, wherein the charge level parameter is at least one of state of charge and voltage of the electrical energy storage packs.

7. The method of claim 2, wherein the upper-level capacity is a maximum configured capacity of the low voltage electrical energy storage.

8. The method of claim 2, wherein the lower-level capacity is a minimum configured capacity of the low voltage electrical energy storage.

9. The method of claim 2, wherein the number of electrical energy storage packs is at least two.

10. The method of claim 2, wherein the electrical energy storage packs are connected to a common traction voltage bus via controllable, by the processor device, contactors.

11. The method of claim 10, wherein the bi-directional DC/DC converter is connected to the common traction voltage bus.

12. The method of claim 11, wherein the low voltage electrical energy storage is connected to the common traction voltage bus only via the bi-directional DC/DC converter.

13. The method of claim 2, wherein the low voltage electrical energy storage is a pre-existing low voltage electrical energy storage of the vehicle.

14. The method of claim 2, wherein the electrical energy storage packs are comprised in an electrical energy storage system providing propulsion electrical power to a vehicle drivetrain.

15. The method of claim 2, wherein the low voltage electrical energy storage is a 12-48 nominal voltage electrical energy storage.

16. The method of claim 2, comprising:

controlling, by the processor device, contactors connected to respective traction electrical energy storage packs and to a traction voltage bus connected to the bi-directional DC/DC converter, when connecting the electrical energy storage packs to the bi-directional DC/DC converter, wherein:

the charge level parameter is at least one of state of charge and voltage of the electrical energy storage packs;

the upper-level capacity is a maximum configured capacity of the low voltage electrical energy storage;

the lower-level capacity is a minimum configured capacity of the low voltage electrical energy storage;

the number of electrical energy storage packs is at least three;

the electrical energy storage packs are connected to a common traction voltage bus via contactors controllable by the processor device;

the bi-directional DC/DC converter is connected to the common traction voltage bus;

the low voltage electrical energy storage is connected to the common traction voltage bus only via the bi-directional DC/DC converter;

the electrical energy storage packs are comprised in an electrical energy storage system providing propulsion electrical power to a vehicle drivetrain; and the low voltage electrical energy storage is a 12-48 nominal voltage electrical energy storage.

17. A vehicle, comprising:

a processor device of a computer system, configured to perform:

detecting a charge parameter imbalance between rechargeable electrical energy storage packs of a vehicle, the electrical energy storage packs being independently connectable to a bi-directional DC/DC converter via a traction voltage bus;

in response to detecting the imbalance and until a target charge parameter level is reached for each of the electrical energy storage packs:

(A) connecting one or more of the electrical energy storage packs to a bi-directional DC/DC converter connectable to a low voltage electrical energy storage to transfer energy from the one or more electrical energy storage pack to the low voltage electrical energy storage via the bi-directional DC/DC converter, (B) detecting that either the low voltage electrical energy storage is at an upper-level capacity or that one of the one or more electrical energy storage pack is discharged to the target charge parameter level, (C) disconnecting the one or more electrical energy storage pack from the bi-directional DC/DC converter, if the target charge parameter level is not reached for each of the electrical energy storage packs, (D) connecting at least one further electrical energy storage pack to the bi-directional DC/DC converter to transfer energy from the low voltage electrical energy storage to the at least one further electrical energy storage pack via the bi-directional DC/DC converter, (E) detecting that either the low voltage electrical energy storage is at lower-level capacity or that the one of the at least one further electrical energy storage pack is at the target charge parameter level, and (F) disconnecting the at least one further electrical energy storage pack from the bi-directional DC/DC converter.

* * * * *